(12) United States Patent
Park

(10) Patent No.: US 9,884,786 B2
(45) Date of Patent: Feb. 6, 2018

(54) RECYCLED ASPHALT CONCRETE WITH MINIMIZED AMOUNT OF FLAT AND ELONGATED PARTICLES, AND MANUFACTURING METHOD THEREFOR

(71) Applicant: JUNGANG ASCON CO., LTD., Daejeon (KR)

(72) Inventor: Hee Jung Park, Daejeon (KR)

(73) Assignee: JUNGANG ASCON CO., LTD., Daejeon (KR)

( * ) Notice: Subject to any disclaimer, the term of this patent is extended or adjusted under 35 U.S.C. 154(b) by 0 days.

(21) Appl. No.: 15/503,037

(22) PCT Filed: Dec. 9, 2015

(86) PCT No.: PCT/KR2015/013416
§ 371 (c)(1),
(2) Date: Feb. 10, 2017

(87) PCT Pub. No.: WO2016/093605
PCT Pub. Date: Jun. 16, 2016

(65) Prior Publication Data
US 2017/0226015 A1    Aug. 10, 2017

(30) Foreign Application Priority Data

Dec. 12, 2014  (KR) .................. 10-2014-0179396
Mar. 26, 2015  (KR) .................. 10-2015-0042719

(51) Int. Cl.
| | | |
|---|---|---|
| C04B 26/26 | (2006.01) |
| C04B 14/06 | (2006.01) |
| C04B 24/08 | (2006.01) |
| C04B 24/20 | (2006.01) |
| C08L 95/00 | (2006.01) |
| C04B 103/40 | (2006.01) |
| C04B 111/00 | (2006.01) |

(52) U.S. Cl.
CPC .............. *C04B 26/26* (2013.01); *C04B 14/06* (2013.01); *C04B 24/08* (2013.01); *C04B 24/20* (2013.01); *C08L 95/00* (2013.01); *C04B 2103/408* (2013.01); *C04B 2111/0075* (2013.01)

(58) Field of Classification Search
CPC ......... C04B 26/26; C04B 24/08; C04B 24/20; C04B 14/06; C08L 95/00; E01C 7/00; E01C 19/00; E01C 19/187; E01C 19/353
See application file for complete search history.

(56) References Cited

U.S. PATENT DOCUMENTS 7,226,500 B2 *  6/2007  Honma ................. C08K 5/134
                                                106/273.1

FOREIGN PATENT DOCUMENTS

| KR | 10-0975361 B1 | 8/2010 |
| KR | 10-1014813 B1 | 2/2011 |
| KR | 10-2011-0032749 A | 3/2011 |
| KR | 10-1300552 B1 | 9/2013 |
| KR | 10-1424759 B1 | 8/2014 |

\* cited by examiner

*Primary Examiner* — Jennifer A Smith
*Assistant Examiner* — Alexandra M Moore
(74) *Attorney, Agent, or Firm* — Rabin & Berdo, P.C.

(57) ABSTRACT

The present invention relates to recycled asphalt concrete and a manufacturing method therefor and, more specifically, to recycled and regenerated asphalt concrete and a manufacturing method therefor, which minimizes the amount of flat and elongated particles included in aggregates used as materials for asphalt concrete, thereby increasing the quality of the asphalt concrete to first grade (the amount of the flat and elongated particles is less than 10%) and increasing the durability of the asphalt concrete.

2 Claims, No Drawings

RECYCLED ASPHALT CONCRETE WITH MINIMIZED AMOUNT OF FLAT AND ELONGATED PARTICLES, AND MANUFACTURING METHOD THEREFOR

TECHNICAL FIELD

The present invention relates to recycled asphalt concrete and a manufacturing method therefor and, more specifically, to recycled asphalt concrete and a manufacturing method therefor, which minimizes the amount of flat and elongated particles included in aggregates used as materials for asphalt concrete, thereby increasing the quality of the asphalt concrete to first grade (the amount of the flat and elongated particles is 10 wt % or less) and increasing the durability of the asphalt concrete.

BACKGROUND ART

Asphalt concrete is an important material used for road construction by combining asphalt, coarse aggregates, and fine aggregates.

In a general manufacturing process of the asphalt concrete, raw materials including aggregates, asphalt, a filler, and the like are mixed at a predetermined ratio, the materials stored in a cold bin are heated with a dryer through horizontal and inclined conveyor belts by adjusting a rpm of a feeder, separated for each standard by screens, and transferred to a hot bin.

However, in aggregates used for manufacturing the asphalt concrete in the related art, the amount of flat and elongated particles is too large and improvement thereof is required. Grades of the aggregates are calculated according to the amount of the flat and elongated particles, and when the amount of the flat and elongated particles is 10% or less, the aggregates are set and used as first grade and recommended in the spot. As the amount of the flat and elongated particles is decreased, a lifespan of the road is long and thus there is no need to frequently repair roads and as a result, traffic congestion may be avoided.

Herein, the used flat and elongated particles mean aggregates in which a ratio of a minimum length to a maximum length of the aggregate is more than ⅓ by using a measurer of the flat and elongated particles.

The aggregates occupying the most part of the entire volume of the asphalt concrete are a very important factor in the asphalt concrete due to a physically and mechanically large influence according to types and quality thereof. In the aggregates, crushed aggregates crushed from a rocky mountain having hardness and good durability exhibit excellent performance, but a supply shortage phenomenon is caused due to a recent sudden increase of construction works. In addition, treatment of waste asphalt concrete also becomes a major social problem. Accordingly, efforts to obtain recycled aggregates from the waste asphalt concrete to reuse the aggregates in manufacturing of the asphalt concrete have been increased.

Particularly, production of aggregates having uniform particle shapes from the coarse aggregates is an important factor of the asphalt concrete, but the amount of the flat and elongated particles has a large difference according to characteristics of the used equipment. In Korea, when the amount of the flat and elongated particles is 10% or less, most of the aggregates which are contributed and produced by set the first grade includes a large amount of flat and elongated particles.

Further, in order to use the recycled aggregates, added materials need to be more cautious and excellent physical properties are required.

DISCLOSURE

Technical Problem

The present invention has been made in an effort to provide first-grade asphalt concrete by a manufacturing method for the asphalt concrete using PCM having an excellent property while minimizing the amount of flat and elongated particles of coarse aggregates.

Technical Solution

One aspect of the present invention provides a manufacturing method for asphalt concrete of manufacturing the asphalt concrete by mixing first-grade natural aggregates, recycled aggregates, asphalt, and polymer control material (PCM) at a predetermined ratio according to the purpose of use, in which the amount of flat and elongated particles in the amount of aggregates maintains less than 10%. Herein, the PCM is called a material obtained by mixing a recycling additive, a modified additive, a dispersant, and a peel reducing agent at a predetermined ratio.

That is, another aspect of the present invention provides recycled asphalt concrete with a minimized amount of flat and elongated particles which consist of 50 to 55 wt % of natural aggregates and recycled aggregates, 35 to 40 wt % of sand, 2.9 to 5 wt % of a filler, and 4.8 to 10 wt % of new asphalt containing PCM so that the amount of the flat and elongated particles is less than 10 wt % of the entire aggregates.

Advantageous Effects

In the asphalt concrete manufactured according to the present invention, since the amount of the flat and elongated particles is maintained as less than 10%, it is possible to satisfy the standard of first grade asphalt concrete and extend a lifespan due to excellent durability by using a PCM additive.

BEST MODE

Generally, in a manufacturing process for asphalt concrete, aggregates are heated in a dryer, sorted, measured, and transferred from a cold bin loaded with the aggregates to a mixer through a conveyer and then mixed with asphalt, PCM, and the like in a mixer.

In this case, a high rate of flat and elongated particles is contained in the mixed coarse aggregates, and as a means for preventing the mixing, crushing and abrasion processes of aggregates are performed.

The crushing process of the aggregates is performed through a crusher and the crusher makes a particle shape of the aggregate supplied to an aggregate inlet to be close to a circle through a process of hitting with a blade and colliding with a wall.

As described above, the crushed aggregates are transferred through the conveyer by passing through the crusher and aggregate screens are installed step by step to sort the aggregates according to sizes of the aggregates. That is, aggregates with particle sizes of less than 13 mm pass through a 13 mm screen net and the aggregates with particle sizes of more than 13 mm are filtered by the screen.

The PCM is added to the entire asphalt concrete using the sorted aggregates to satisfy the mechanical property of the asphalt concrete and the used PCM consists of four ingredients.

That is, the present invention provides recycled asphalt concrete with a minimized amount of flat and elongated particles which consist of 50 to 55 wt % of natural aggregates and recycled aggregates, 35 to 40 wt % of sand, 2.9 to 5 wt % of a filler, and 4.8 to 10 wt% of new asphalt containing PCM so that the amount of the flat and elongated particles is less than 10 wt% of the entire aggregates.

The PCM may be contained with 10.0 to 30.0 wt % in the new asphalt and these ingredients and contents are as follows.

1) The content of the recycling additive is 5.0 to 10.0 wt % in the new asphalt and the used recycling additive consists of one of paraffinic and aromatic mixed oils or malten oil, Baca C oil (containing 10 to 20 wt % of asphalt and 15 to 30 wt % of malten oil).

2) The content of the modified additive is 5.0 to 10.0 wt % in the new asphalt and a configuration of the used modified additive consists of one of waste tire fine powder, low density polyethylene (LLDPE) fine powder, SBS, SBR, SBI, SEBS, and EPDM or a mixture thereof.

3) The content of the dispersant is 1 to 5 wt % in the new asphalt and the used dispersant consists of one of PE Wax, PP Wax, and Amide Wax or a mixture thereof.

4) The content of the peel reducing agent is 1.0 to 5.0 wt % in the new asphalt and the used peel reducing agent is a material matched with cations on the aggregate surface and consists of one of quaternary ammonium or p-TSA in order to maximize adhesion with the aggregates.

Table 1 illustrates a PCM ingredient composition table according to Example of the present invention.

TABLE 1

| Classification | PCM-1 | PCM-2 | PCM-3 | PCM-4 | PCM-5 | PCM-6 |
|---|---|---|---|---|---|---|
| A(5~10%) | 3.0% | 5.0% | 5.0% | 10.0% | 10.0% | 10.0% |
| B(5~10%) | 3.0% | 5.0% | 10.0% | 5.0% | 10.0% | 10.0% |
| C(1~5%) | 1.0% | 3.0% | 3.0% | 3.0% | 3.0% | 5.0% |
| D(1~5%) | 1.0% | 2.0% | 2.0% | 2.0% | 2.0% | 5.0% |
| Total | 8.0% | 15.0% | 20.0% | 20.0% | 25.0% | 30.0% |

A: Recycling additive
B: Modified additive: SBS
C: Dispersant: PE wax
D: Peel reducing agent: p-TSA That is, first, first grade natural aggregates and recycled aggregates (13 mm), sand, a filler, and new asphalt containing PCM were mixed in a hot bin heated at 130 to 150° C. through a mixing design and a mixing design composition table thereof is illustrated in Table 2 below.

TABLE 2

| Classification | Comparative Example 1 | Comparative Example 2 | Example 1 | Example 2 | Example 3 | Example 4 | Example 5 | Example 6 |
|---|---|---|---|---|---|---|---|---|
| 13 mm natural aggregates | 276.0 | 257.0 | | | | | | |
| Sand | 390.0 | 409.0 | | | | | | |
| 13 mm recycled aggregates | 257.0 | 257.0 | | | | | | |
| Filler | 29.0 | 29.0 | | | | | | |
| New asphalt | 48.0 | 48.0 | 44.1 | 40.8 | 38.4 | 38.4 | 36.0 | 33.6 |
| PCM-1(12%) | | | 3.9 | | | | | |
| PCM-2(15%) | | | | 7.2 | | | | |
| PCM-3(20%) | | | | | 9.6 | | | |
| PCM-4(20%) | | | | | | 9.6 | | |
| PCM-5(25%) | | | | | | | 12.0 | |
| PCM-6(30%) | | | | | | | | 14.4 |
| Total | | | 1,000.0 | | | | | |

Table 3 below illustrates a mixing design composition table without adding PCM in comparison with Example according to the present invention.

TABLE 3

| Used material | Mixed ratio (%) | Calculation basis | Mixed amount (kg) | Material mixed ratio (%) |
|---|---|---|---|---|
| 13 mm natural aggregates | 29 | 1000 * (1 − A/100) * B/100 | 276 | 27.6 |
| Sand | 41 | 1000 * (1 − A/100) * B/100 | 390 | 39 |
| 13 mm recycled aggregates 1.1 | 25.9 | 1000 * (1 − A/100) * B/100 | 257 | 25.7 |
| Filler | 3 | 1000 * (1 − A/100) * B/100 | 29 | 2.9 |
| New asphalt | 4.8 | 1000 * (A/100) | 48 | 4.8 |
| Total | | | 1000 | 100.0 |

Note
Calculation basis legend: A = AP ratio (%) B = Aggregates ratio per bin (%) * Asphalt content = New asphalt + Old asphalt included in recycled aggregates 4.8 + 1.1 = 5.9%

Table 4 below illustrates a mixing design composition table of Example 3 according to the present invention.

TABLE 4

| Used material | Mixed ratio (%) | Calculation basis | Mixed amount (kg) | Material mixed ratio (%) |
|---|---|---|---|---|
| 13 mm natural aggregates | 27 | 1000 * (1 − A/100) * B/100 | 257 | 25.7 |
| Sand | 43 | 1000 * (1 − A/100 ) * B/100 | 409 | 40.9 |
| 13 mm recycled aggregates 1.1 | 25.9 | 1000 * (1 − A/100) * B/100 | 257 | 25.7 |
| Filler | 3 | 1000 * (1 − A/100) * B/100 | 29 | 2.9 |

TABLE 4-continued

| Used material | Mixed ratio (%) | Calculation basis | Mixed amount (kg) | Material mixed ratio (%) |
|---|---|---|---|---|
| New asphalt | 3.84 | 1000 * (A/100) | 42.2 | 4.22 |
| PCM-1 | 0.96 | | 5.8 | 0.58 |
| Total | | | 1000 | 100.0 |

Note
Calculation basis legend: A = AP + PCM ratio (%) B = Aggregates ratio per bin (%) * Asphalt content = New asphalt + PCM + Old asphalt included in recycled aggregates 4.22 + 0.58 + 1.1 = 5.9%

Table 5 below is a property table illustrated by comparing properties in Comparative Examples and Examples according to the present invention.

TABLE 5

| Classification | Comparative Example 1 | Comparative Example 2 | Example 1 | Example 2 | Example 3 | Example 4 | Example 5 | Example 6 |
|---|---|---|---|---|---|---|---|---|
| Stability (N) 6,000 or more | 11,312 | 11,942 | 13,538 | 13,860 | 14,205 | 13,950 | 14,305 | 14,950 |
| Flow value (1/100 cm) 20~40 | 36 | 33 | 31 | 28 | 27 | 28 | 24 | 23 |
| Porosity (%) 3~6 | 4.7 | 4.6 | 4.4 | 4.4 | 4.4 | 4.3 | 4.3 | 4.3 |
| Saturation (%) 70~85 | 74.1 | 74.5 | 75.4 | 75.4 | 75.4 | 75.2 | 75.8 | 75.8 |
| Density (g/) | 2.355 | 2.358 | 2.362 | 2.363 | 2.363 | 2.364 | 2.364 | 2.365 |
| Indirect tensile strength (N/) 0.8 or more | 1.3 | 1.4 | 1.5 | 1.5 | 1.6 | 1.5 | 1.6 | 1.6 |
| Tensile strength index after soaking 0.7 or more | 0.8 | 0.9 | 1.0 | 1.0 | 1.1 | 1.0 | 1.1 | 1.2 |
| Toughness (N*) 8,000 or more | 10,359 | 10,864 | 11,104 | 11,140 | 11,210 | 11,150 | 11,270 | 11,360 |
| Asphalt amount (%) 4.5-7.0 | 5.9 | 5.9 | 5.9 | 5.9 | 5.9 | 5.9 | 5.9 | 5.9 |

Comparative Example 1 illustrates physical properties for asphalt concrete without using first grade aggregates, Comparative Example 2 illustrates physical properties of asphalt concrete in which only new asphalt is added in the mixture of first grade natural aggregates and recycled aggregate, and Examples 1 to 6 illustrate physical properties of asphalt concrete adding PCM.

First, Comparative Examples 1 and 2 illustrate that stability and indirect tensile strength in comparison and a tensile strength index after soaking are also improved.

In terms of stability, as compared with Examples 1 to 3, in Examples 5 and 6, the recycling additive of the PCM is increased and the content of the modified additive is increased, and thus the physical properties are excellent.

As the content of the dispersant (PE wax) is increased, the physical property values are good, and even though the peel reducing agent is increased, there is no numerical increase when the content is a predetermined amount or more.

First, when an ingredient A (a recycling additive) of the PCM is less than 3.0%, the ingredient A does not satisfy a role of a restorative and when the content is 10.0% or more, a very soft phenomenon occurs and thus it is preferred that the optimum use amount is 0.5%.

Second, when an ingredient B (a modified additive, SBS) of the PCM is less than 3.0%, the ingredient B does not satisfy a role of a modifier and when the content is 10.0% or more, viscosity is too high and thus it is preferable that the optimal use amount is 10.0%.

Third, when an ingredient C (a dispersant, PE-wax) of the PCM is less than 1.0%, the ingredient C does not satisfy a role of a dispersant and when the content is more than 5.0%, the viscosity is too deteriorated and thus it is preferred that the optimal use amount is 3.0%.

Fourth, when an ingredient D (a peel reducing agent, p-TSA:p-toluene sulfonic acid) of the PCM is less than 1.0%, the ingredient D does not satisfy a role of suppressing peeling of aggregates and when the content is more than 2.0%, the effect is similar and thus it is preferred that the optimal use amount is 2.0%.

As a result of summarizing the physical properties, the physical properties in Example 3 were the most excellent.

What is claimed is:

1. A recycled asphalt concrete with a minimized amount of flat and elongated particles, wherein the recycled asphalt concrete consists of 50 to 55 wt % of natural aggregates and recycled aggregates, 35 to 40 wt % of sand, 2.9 to 5 wt % of a filler, and 4.8 to 10 wt % of new asphalt containing PCM so that the amount of the flat and elongated particles is less than 10 wt % of the entire aggregates, wherein the PCM consists of 5 to 10 wt % of a recycling additive consisting of one of paraffinic and aromatic mixed oils or malten oil, Baca C oil (containing 10 to 20 wt % of asphalt and 15 to 30 wt % of malten oil), 5 to 10 wt % of a modified additive, 1 to 5 wt % of a dispersant, and 1 to 5 wt % of p-toluene sulfonic acid (p-TSA) as a peel reducing agent with respect to the new asphalt.

2. A recycled asphalt concrete with a minimized amount of flat and elongated particles, wherein the recycled asphalt concrete consists of 50 to 55 wt % of natural aggregates and recycled aggregates, 35 to 40 wt % of sand, 2.9 to 5 wt % of a filler, and 4.8 to 10 wt % of new asphalt containing PCM so that the amount of the flat and elongated particles is less than 10 wt % of the entire aggregates, wherein the PCM is constituted by mixing 5 to 10 wt % of a recycling additive consisting of one of paraffinic and aromatic mixed oils or malten oil, Baca C oil (containing 10 to 20 wt % of asphalt and 15 to 30 wt % of malten oil), 5 to 10 wt % of a modified additive, 1 to 5 wt % of a dispersant, and 1 to 5 wt % of p-toluene sulfonic acid (p-TSA) as a peel reducing agent with respect to the new asphalt.

\* \* \* \* \*